United States Patent
Yamano et al.

[11] Patent Number: 6,011,956
[45] Date of Patent: Jan. 4, 2000

[54] MEANS FOR PREDICTING FADING STATE IN RADIO COMMUNICATION SYSTEM

[75] Inventors: Chiharu Yamano; Yuichi Shiraki; Kiyoki Sekine, all of Toyko, Japan

[73] Assignee: Oki Electric Industry Co., Ltd, Tokyo, Japan

[21] Appl. No.: 08/934,591

[22] Filed: Sep. 22, 1997

[30] Foreign Application Priority Data

Oct. 14, 1996 [JP] Japan .................................. 8-270524

[51] Int. Cl.[7] .................................................. H04B 1/00
[52] U.S. Cl. ........................... 455/67.1; 455/69; 455/10; 455/67.3; 375/358
[58] Field of Search .............................. 455/10, 67.3, 69, 455/63, 67.6, 522; 375/358; 370/335

[56] References Cited

U.S. PATENT DOCUMENTS

| | | | |
|---|---|---|---|
| 4,593,398 | 6/1986 | Millar | 375/27 |
| 5,093,842 | 3/1992 | Gimlin et al. | 375/10 |
| 5,257,283 | 10/1993 | Gilhousen | 375/1 |
| 5,535,238 | 7/1996 | Schilling et al. | 375/200 |
| 5,654,667 | 8/1997 | Adachi | 329/306 |
| 5,719,898 | 2/1998 | Davidovici et al. | 375/200 |
| 5,852,782 | 12/1998 | Komatsu | 455/522 |
| 5,881,367 | 3/1999 | Calot et al. | 455/69 |

OTHER PUBLICATIONS

Andrew J. Viterbi, "CDMA Principles of Spread Spectrum Communication", published by Addison Wesley, 1995, pp. 100–119.

*Primary Examiner*—Dwayne D. Bost
*Assistant Examiner*—Joy Redmon

[57] ABSTRACT

The object of the present invention is to provide a radio communication system capable of following change in fading. To attain the object, the transmitter in the radio communication system according to the present invention predicts the state of fading after the specified period of time based on the fading state signal indicative of state of fading at current time notified by the receiver, thereby amplifies the transmission signal in accordance with the predicted state of fading.

8 Claims, 5 Drawing Sheets

Fig. 3

| PC(n) ⇐ | E(n) / S(n) |
|---|---|
| 0 1 | LARGER THAN 0.6772 |
| 0 0 | LARGER THAN 0 AND NOT MORE THAN 0.6772 |
| 1 0 | NOT LESS THAN -0.6772 AND LESS THAN 0 |
| 1 1 | LESS THAN -0.6772 |

Fig. 4

| PC(n) ⇒ | F(PC(n)) |
|---|---|
| 0 1 | 2 |
| 0 0 | 1 |
| 1 0 | -1 |
| 1 1 | -2 |

Fig. 5

| Eq(n) ⇐ | PC(n) |
|---|---|
| S(n) × 1.2720 | 0 1 |
| S(n) × 0.3229 | 0 0 |
| -S(n) × 0.3229 | 1 0 |
| -S(n) × 1.2720 | 1 1 |

Fig. 6

$$\begin{pmatrix} A1(n) \\ A2(n) \\ \vdots \\ Ap(n) \end{pmatrix} = \begin{pmatrix} Rxx(0) & Rxx(1) & \cdots & Rxx(p-1) \\ Rxx(1) & Rxx(0) & \cdots & Rxx(p-2) \\ \vdots & \vdots & \ddots & \vdots \\ Rxx(p-1) & Rxx(p-2) & \cdots & Rxx(0) \end{pmatrix}^{-1} \begin{pmatrix} Rxx(1) \\ Rxx(2) \\ \vdots \\ Rxx(p) \end{pmatrix} \quad \cdots (8)$$

MEANS FOR PREDICTING FADING STATE IN RADIO COMMUNICATION SYSTEM

BACKGROUND OF THE INVENTION

The present invention relates to a communication apparatus and communication system, such as a communication system including a base station and a mobile station according to a CDMA (Code Division Multiplex Access) communication scheme.

In digital mobile wireless communication approaches, fading causes SNR (Signal-to-Noise Ratio) to worsen, leading to deterioration of communication quality. Spread spectrum systems like a CDMA communication system also have frequency selective fading due to multi-paths and fading caused by the high-speed movement of a mobile station to a base station, which are troublesome.

To solve the problems and enhance the communication quality, there has been known a method of stabilizing the receipt level at a base station to a constant by controlling transmission power (e.g., reverse linkage power control) at a mobile station, during wireless transmission from the mobile station to a base station as described in the following reference.

Andrew J. Viterbi, 'CDMA Principle of Spread Spectrum Communication', pp. 113–119, published by Addison Wesley, 1995

A wireless communication system using the reverse link power control method is shown in FIG. 2. Base station 1 receives a signal influenced by fading. The signal is demodulated into a receipt data signal by digital demodulator 10, and the power (receipt power level) of the decoded receipt data signal is measured by power measurement circuit (POW) 11. The measured power is provided to power control information generation circuit 12. In power control information generation circuit 12, the difference between the receipt power level and a targets power level held in target level holding unit (M) 14 is calculated by subtractor 13. According to the signal of the difference, one bit of transmission power control information is formed, which indicates whether the transmission power at mobile station 2 should increase or decrease. The transmission power control information is multiplexed with transmission data by digital modulator 16, thereby being digitally modulated to be sent to mobile station 2.

In mobile station 2, a receipt signal arrived via a transmission path from the base station is demodulated. Transmission power control information is separated from the obtained receipt data signal, and it is provided to inverse quantization circuit ($Q^{-1}$) 22. Inverse quantization circuit 22 outputs, for example, a power modification signal of +0.5 dB to increase the power, or −0.5 dB to decrease. The outputted signal is added to the current power control value outputted from one sample delay circuit ($Z^{-1}$) 24, whereby a new power control value can be generated. Linear region conversion circuit (EXP) 25 converts it into a power control value in the linear region, which is then applied to a control terminal of transmission power amplifier (A) 26, which is a variable amplification unit. Thereby, the power of a transmission signal is directed toward base station 1.

In summary, in the above processes, the difference between a receipt power level and the target power level is quantized with one bit and then transmitted, and the transmitted signal experiences integral calculus to restore the fading signal, which is canceled by controlling variable amplifier 26 through the inverse characteristics of the processes. The processes assumes that a fading signal does not change for a short period of time. Herein, the fading signal denotes the characteristic of fading. The fading signal is defined as a ratio of a receipt power Pb of the base station to a transmission power Pm of the mobile station; that is to say, the fading signal X=(receipt power Pb)/(transmission power Pm). The fading signal changes with time. Therefore, the function of the fading signal is defined as X(n), where n indicates a time.

However, on the assumption, transmission power control cannot follow rapid change in fading which may occur during high speed movement of the mobile station.

Moreover, though transmission power control in the mobile station needs transmission power control information from the base station, there lies a process delay period of time by the time that transmission power control information from the base station reaches the mobile station. Since a large fading may occur for a large process delay period of time, the conventional method of controlling transmission power cannot perfectly follow such a fading, whereby a large error of transmission power control deteriorates communication quality.

SUMMARY OF THE INVENTION

Therefore, the object of the present invention is to provide a radio communication system capable of following changes in fading in aerial propagation path to transmit signals using electric power necessary for the predicted fading.

According to one aspect of the present invention, radio communication system which comprises a transmitter transmitting a first signal to a receiver via aerial propagation path and the receiver receiving a second signal which has experienced a fading through the aerial propagation path, wherein the transmitter comprises predicting means for predicting the state of the fading after a specified period of time based upon a fading state signal at current time notified by the receiver; amplifying means for amplifying the first signal based upon the predicted state of the fading; and transmitting means for transmitting the first signal, and the receiver comprises receiving means for receiving the second signal; generating means for generating the fading state signal indicative of the state of the fading at current time; and notifying means for notifying the transmitter of the fading state signal.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 3 shows tables to describe the operation of quantization circuit of the first embodiment;

FIG. 4 shows tables to describe the operation of scale adaptive circuit of the first embodiment;

FIG. 5 shows tables to describe the operation of inverse quantization circuit of the first embodiment;

FIG. 6 shows a simultaneous equation; and

DESCRIPTION OF THE PREFERRED EMBODIMENTS

<First Embodiment>

Hereinafter, a first embodiment in which a communication system and communication apparatus according to the present invention is applied to a mobile communication system and a mobile station will be described in detail with reference to the accompanying drawings.

Figure 1:
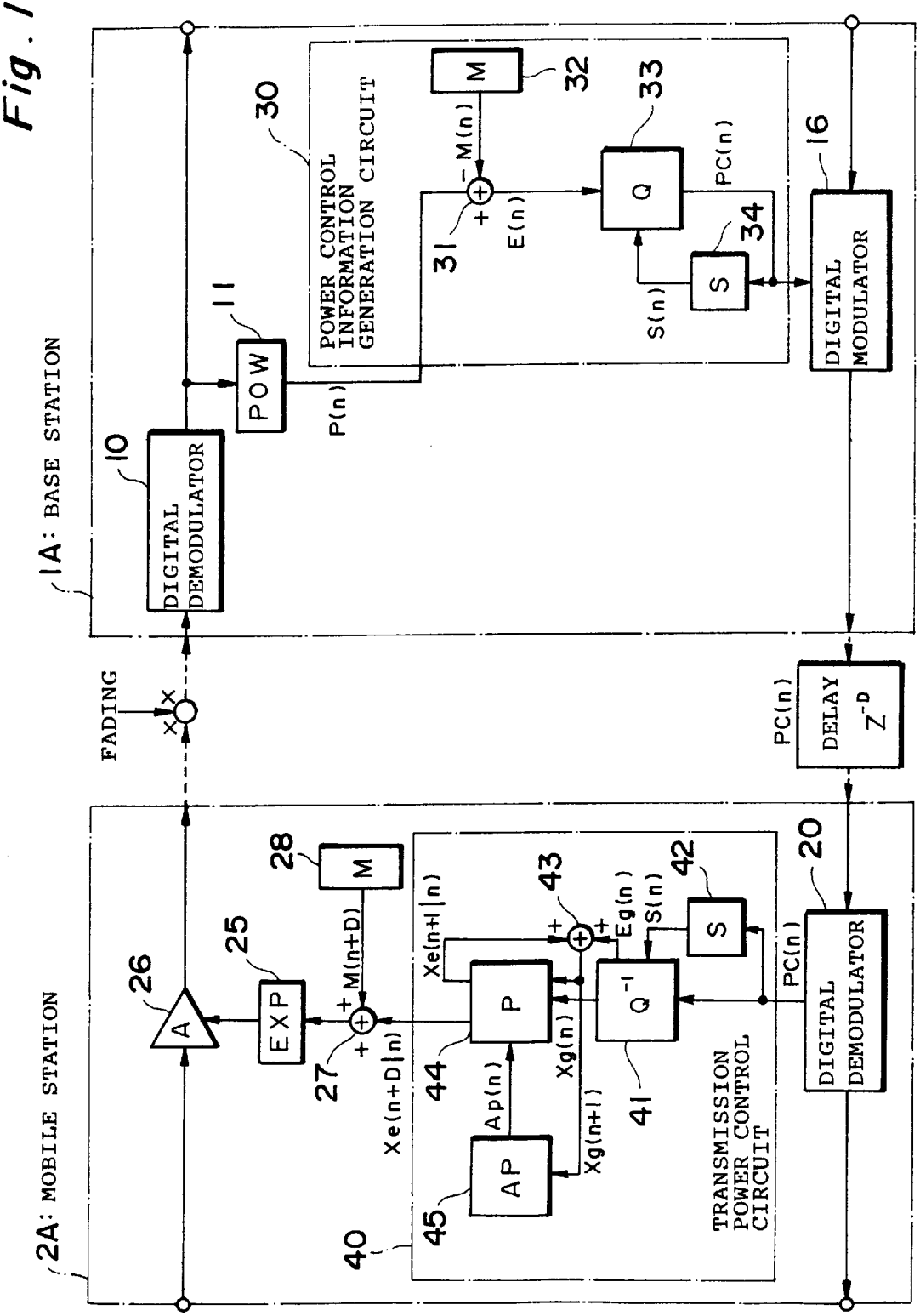
FIG. 1 shows a configuration of a communication system of a first embodiment.
Figure 2:
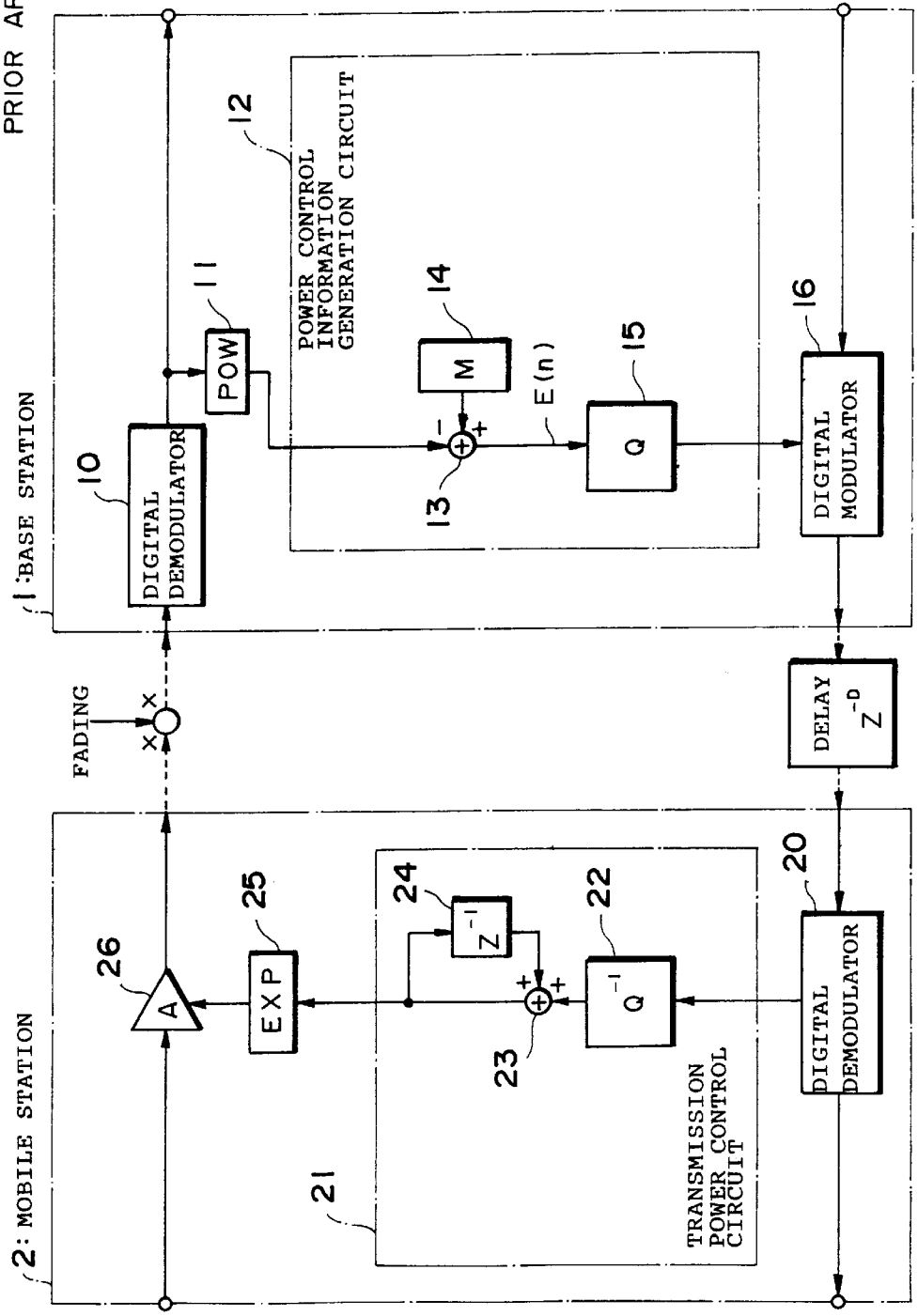
FIG. 2 shows a conventional configuration.

FIG. 1 is a diagram showing the power control according to a reverse link power control method in a mobile communication system of the first embodiment. Herein, the same and corresponding units are attached with the same reference numerals as those in FIG. 2.

First, the power control structure according to the reverse link control method in base station 1A will be described. To control transmission power of mobile station 2A, base station 1A has digital demodulator 10, power measurement circuit (POW) 11, power control information generation circuit 30, and digital modulator 16.

Digital demodulator 10 receives a signal from mobile station 2A influenced by fading, and demodulates the received signal. Moreover, the demodulated data signal RBS (i) (i is an integer larger than 0 indicating a sample number: a sample number corresponding to symbol rate) is provided to power measurement circuit 11 as well as a processing unit (not shown) for demodulated data signals.

Power measurement circuit 11 measures power P (n) [dB] of receipt level information (transmission power information of mobile station 2A) using encoding data signal RBS (i). Power measurement circuit 11, for example, assumes demodulated data signal RBS (i) outputted via digital demodulator 10 at information symbol periods of 32 KHz as an input signal, and calculates power P (n), which follows from the following equation (1) in which the mean of squares for 20 samples is converted into a decibel (dB) unit.

$$P(n) = 10\log_{10}(\Sigma RBS(i-k)^2/20) \quad (1)$$

Herein, the sample number of 20 in terms of the average is determined according to transmission power control period and symbol rate. Accordingly, transmission power control is performed with 1.6 KHz (32 KHz/20). Moreover, n denotes a sample time of power control. The summation $\Sigma$ in equation (1) is calculated over the area of "(n−1)×20+1" to "n×20". To calculate receipt power P(n), weighted mean or exponential smoothing can work.

Power control information generation circuit 30 are made up of subtractor 31, target level holding unit (M) 32, quanitization circuit (Q) 33 and scale adaptive circuit (S) 34.

Subtractor 31 and target level holding unit 32 construct a subtraction circuit to subtract target level M (dB) from measured transmission power P (n) of a mobile station, and provides the subtracted signal E (n) to quantization circuit 33. As is shown in equation (2), difference signal E (n) between receipt power P (n) and target power M (n) is calculated. Further, target power M (n) is determined, which is ordinarily determined to a constant value, in such a fashion that communication quality can be preserved within a permissible range. Though there are communication systems in which a target power is transmitted and received between base station 1A and mobile station 2A in advance; for power control, the target power is constant value.

$$E(n) = P(n) - M(n) \quad (2)$$

Quantization circuit 33 normalizes difference signal E (n) using scale (quantization step) S (n) (which is almost equal to the standard deviation of difference signal E (n)) from scale adaptive circuit 34 so as to let variance 1. Subsequently, in accordance with FIG. 3, quantization value PC (n) is obtained, which is, as transmission power control information, outputted to scale adaptive circuit 34 and digital modulator 16. Here, quantization values PC (n) of '01', '00', '10', and '11' denote that transmission power of mobile station 2A is quite large, large, small, and quite small, respectively.

Scale adaptive circuit 34 outputs scale S (n+1) using the six samples of quantization values PC (n), . . . , PC (n−5) which lie up to now. Definitely, according to FIG. 4, two-bit quantization value PC (n) is converted to value F (PC (n)), which indicates positive or negative magnitude. After that, according to equation (3), the mean m (n) of its absolute value is calculated. Finally, according to equation (4), scale S (n+1) at next time is calculated. Summation $\Sigma$ in equation (3) is in terms of the area of 0 to 5.

$$m(n) = \Sigma|F(PC(n-k))|/6 \quad (3)$$

$$S(n+1) = S(n) \times 2^{((m(n)-1.5)/4)} \quad (4)$$

When scale S (n) is proper, a series of quantization values PC (n) take four codes randomly. Consequently, absolute value mean m (n) is close to 1.5. In this case, scale S (n) is nearly equivalent to the standard deviation of difference signal E (n), and scale S (n) for next time is updated so as to let the scale S (n+1) at the next time equal to the scale S (n) at present time.

When scale S (n) is smaller than the standard deviation E (n), the series of quantization values PC (n) frequently take '01' and '11', whereby the absolute value mean m (n) is larger than 1.5. Thus, scale S (n+1) at next time is updated to be larger than scale S (n) at present time.

On the contrary, the alternate operation makes scale S (n+1) at next time updated in such a fashion that it becomes smaller than scale S (n) at current time, when scale S (n) is larger than the standard deviation of difference signal E (n).

As described above, scale S (n+1) is updated so that scale S (n+1) can always equal to the standard deviation of difference signal E (n).

In addition, the number of samples (i.e., six samples) for use in scale updating and parameters like '4'in equation (4), which acts to determine updating amount of the scale at next time, decides a follow-up speed of power control against a fading, wherein empirical values are employed in the first embodiment.

Digital modulator 16 multiplexes 2 bit quantization value PC (n) outputted from quantization circuit 33 with transmission data, as transmission electric power control information. Thereafter, the multiplexed value experiences digital modulation, thus, being transmitted to mobile station 2A.

Next, electric power control structure and operation thereof according to a reverse link power control method of mobile station 2A will be described.

Among the structural units for controlling transmission power in mobile station 2A, there are digital demodulator 20, transmission power control circuit 40, target level holding unit (M) 28, adder 27, linear region conversion circuit 25 and transmission power amplifier 26.

Transmission power control circuit 40 is made up of inverse quantization circuit ($Q^{-1}$) 41, scale adaptive circuit (S) 42, adder 43, filtering circuit (P) 44, and prediction coefficient calculation circuit (AP) 45.

Digital demodulator 20 digitally demodulate(s) receipt signal from base station 1A, and separates a series of 2 bit quantization value PC (n) serving as transmission power control information, from the demodulated data signal for each of transmission power control periods (0.625 msec=1/1.6 kHz), thereby providing them to scale adaptive circuit 42 and inverse quantization circuit 41.

Scale adaptive circuit 42, which performs the same operation as scale adaptive circuit 34 in base station 1A, generates scale S (n) using the past six samples of quantization values PC (n−1), ..., PC (n−6), and then outputs them to inverse quantization circuit 41.

Inverse quantization circuit 41 obtains inverse-quantization difference signal Eq (n) corresponding to difference signal E (n) between a receipt level and a target level at base station 1A from auantization value PC (n) outputted from digital demodulator 20 and scale S (n) outputted from scale adaptive circuit 42 as shown in FIG. 5, and outputs it to adder 43.

Filtering circuit 44 generates prediction signal Xe (n+1|n) of a fading signal for next time n+1 at time n, by linear prediction as shown in equation (5), using restoration signals Xq (n), Xq (n−1), ..., and Xq (n−p+1) of the fading signal between time n and time n−p+1 periodically outputted from adder 43, and p number of coefficients A1 (n), A2 (n), ..., and Ap (n) at time n provided from prediction coefficient calculation circuit 45. Further, filtering circuit 44 provides the result to adder 43. Further, summation Σ in equation (5) is in terms of k taken from 1 to p.

$$Xe(n+1|n)=-(\Sigma Ak(n) \times Xq(n-k+1)) \quad (5)$$

Moreover, filtering circuit 44 calculates, according to equation (6), prediction value Xe (n+D|n) of a fading signal at time n+D, which denotes time D after the time n, using the prediction value of a fading signal shown in equation (5), then outputs the result to adder 27. The first summation Σ in equation (6) is in terms of k taken from 1 to j while the second summation Σ is in terms of k taken from j+1 to p. Herein, j ranges from 2 to D.

$$Xe(n+j|n)=-(\Sigma Ak(n) \times Xe(n+j-k|n) + \Sigma Ak(n) \times Xq(n-k+j+1)) \quad (6)$$

Herein, time D is determined to be the time equivalent to a processing delay from the when power measurement circuit 11 in base station 1A measures power until the when the amplification factor of transmission power amplifier 26 in mobile station 2A changes. Propagation delay through the propagation channel is much smaller than that of propagation through base station 1A or mobile station 2A. Thus, time D can be almost exactly determined in a designing step. Furthermore, most processing delay time D is a waiting time for putting transmission power control information onto transmission data by digital modulator 16.

Prediction coefficient calculation circuit 45 generates linear prediction coefficients A1 (n), A2 (n), ..., and Ap (n), which are used for filtering circuit 44 as follows.

Prediction coefficient calculation circuit 45, at first, calculates self-correlation values Rxx (0), Rxx (1), ..., and Rxx (p) according to equation (7) using fading restoration signals Xq (n), Xq (n−1), etc. In equation (7), T is 0, 1, ..., p, while summation Σ is in terms of k taken from 0 to 63.

$$Rxx(T)=\Sigma Xq(n-k) \times Xq(n-k-T)/64 \quad (7)$$

Next, prediction coefficient calculation circuit 45 solves simultaneous equation (8) in FIG. 6 brought from a linear prediction method to obtain prediction coefficients A1 (n), ..., and Ap (n), which are provided to filtering circuit 44.

Further, in place of directly solving the simultaneous equation (8), Rabinson-Davin method and Bague method for calculating linear prediction coefficients, which are known as a high speed solving method of the simultaneous equation as shown above, can be available. Moreover, coefficient modification method according to LMS (yeast Mean Square) algorithm can also be available in order to decrease processing amount.

Adder 43 adds prediction value Xe (n+1|n) of a fading signal at next time n+1 from filtering circuit 44 and difference signal Eq (n+1) inversely quantized at time n+1 from inverse quantization circuit 41 as shown in equation (9), thus outputting restoration signal Xq of a fading signal at time n+1 to filtering circuit 44 and prediction coefficient calculation circuit 45.

$$Xq(n+1)=Eq(n+1)+Xe(n+1|n) \quad (9)$$

Prediction value Xe (n+1|n) of a fading signal at time n+D outputted from filtering circuit 44, is provided to adder 27. Adder 27 adds target power level M (n+D) held in target level holding unit (M) 28 to the prediction value Xe (n+1|n), thereby acquiring, a power level of a transmission signal at time n+D which has experienced a fading.

Linear region conversion circuit 25 converts the electric power level into a signal designating amplification factor A (n+D) in transmission power amplifier 26 according to equation (10), and applies the signal to a control terminal of transmission power amplifier 26 so that transmission power can be controlled properly with the inverse characteristic described above. Since values of dB notation are processed before linear region conversion circuit 25, the linear region conversion circuit 25 is necessary.

$$A(n+D)=10((-Xe(n+D|n)+M(n+D))/10) \quad (10)$$

As mentioned above, according to the first embodiment, a mobile station generates prediction value Xe (n|n−D) of fading signal X (n) at time n−D, with taking into account processing delay time D which is the duration from power measurement by a base station to the execution of power control by the mobile station according to the measured power, thereby carrying out transmission power control to suppress a fading (nearly equal to X (n)) at time n. Thus, the communication apparatus of the first embodiment can follow the change of fading more correctly than a conventional communication apparatus with no prediction, thus resulting in high quality of communication.

Furthermore, use of two bits of information, which is larger than the conventional, as power control information, can enhance the prediction accuracy, which effectively realizing the above effect. Similarly, the scale which is changeable adaptively favors the improvement of the prediction accuracy.

<Second Embodiment>

A communication apparatus and communication system of the second embodiment according to the present invention will be detailed with reference to drawings.

Figure 7:
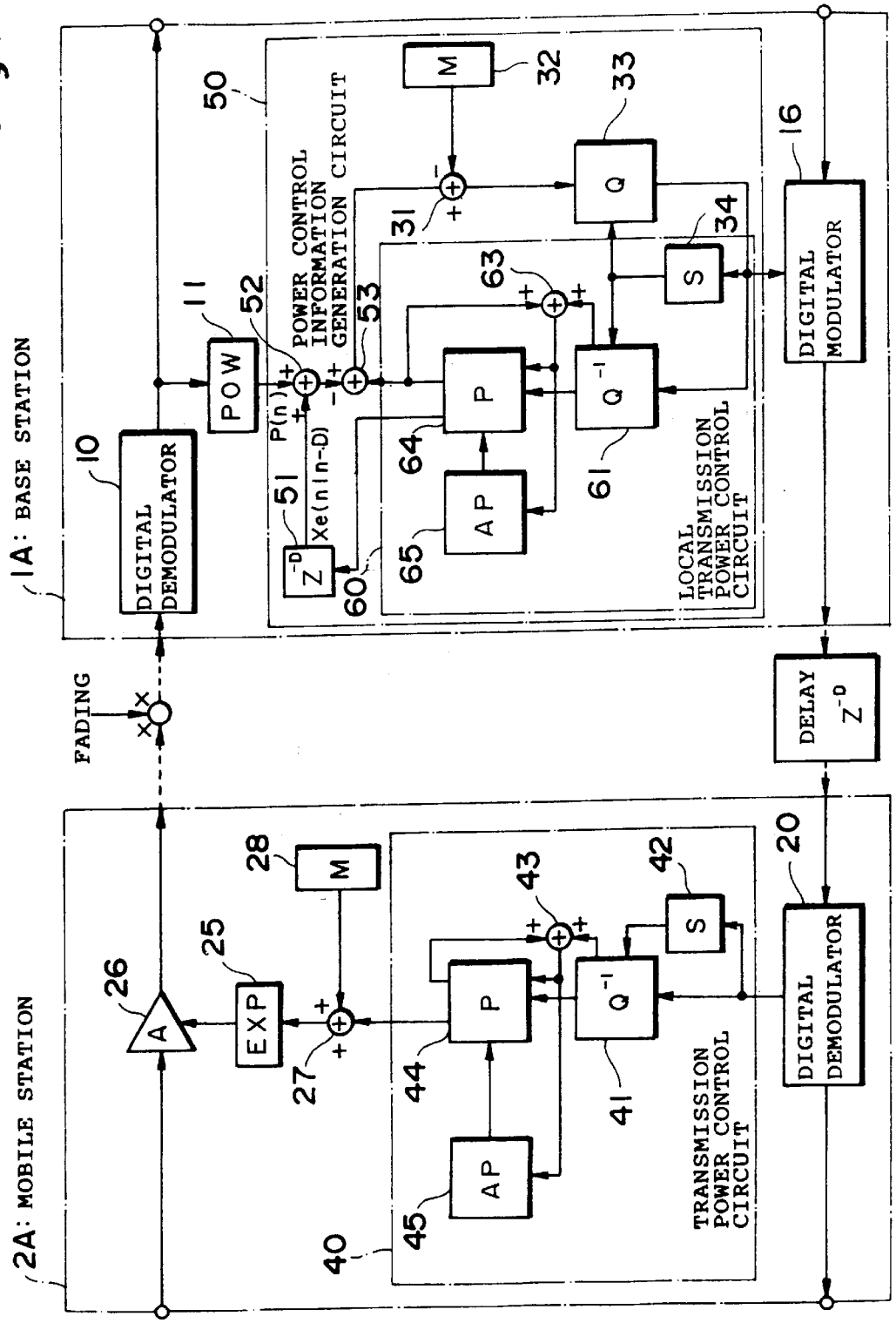
FIG. 7 shows a configuration of a communication system of a second embodiment.

FIG. 7 shows a configuration of power control according to a reverse link power control method in a mobile communication system of the second embodiment. The same reference numerals are attached to the corresponding units to those in FIG. 1 of the first embodiment.

The structure and function of mobile station 2B of the second embodiment are identical with those in mobile station 2A of the first embodiment. Accordingly, in the second embodiment, base station 1B will be described in detail.

In base station of the second embodiment, internal structure of power control information generation circuit 50 is diffeirent from that in base station of the first embodiment. In addition to structural units in power control information generation circuit 30 of the first embodiment, power control information generation circuit 50 comprises local transmission power control circuit 60, time D delay circuit 51, adder 52 and subtractor 53, wherein prediction coding is employed for coding difference signal for target level.

Local transmission power control circuit 60 has the same configuration as transmission power control circuit 40 of mobile station 2B. That is, local transmission power control circuit 60 comprises inverse quantization circuit ($Q^{-1}$) 61, scale adaptive circuit (S) 34, adder 63, filtering circuit (P) 64 and prediction coefficients calculation circuit (AP) 65, and operates in the same way as in transmission power control circuit 40 of mobile station 2B.

Further, scale adaptive circuit 34, which is used by quantization circuit 33, is one of structural units in local transmission power control circuit 60.

Local transmission power control circuit 60 provides at time n prediction value Xe (n+D|n) of a fading signal for time n+D, to time D delay circuit 51, and also provides at time n−1 prediction value Xe (n|n−1) of a fading signal for time n.

Time D delay circuit 51 delays an input signal by time D, and outputs it. Thus, at time n when prediction value Xe (n+D|n) of a fading signal is inputted to time D delay circuit 51, prediction value Xe (n|n−D) of a fading signal is outputted from time D delay circuit 51, and the prediction value Xe (n|n−D) of the fading signal is provided to adder 52.

Next, the output P (n) from power measurement circuit 11 is provided to adder 52. Adder 52 adds prediction value Xe (n|n−D) of a fading signal from time D delay circuit 51 to the output P (n) from power measurement circuit 11, and the added result is provided to subtractor 53. By the addition, power control signal −Xe (n|n−D) in mobile station 2B is canceled, and provided to subtractor 53.

Subtractor 53 subtracts prediction value Xe (n|n−1) of a fading signal at time n, which is predicted from information at time n−1, from the output of adder 52, and provides the subtraction result to subtractor 31. The following processes after subtractor 31 are the same as those in the first embodiment.

Subtractor 53 implements the subtraction between a real fading signal and its prediction value, which allows the remainder to be small in dynamic range with less influence of fading. Therefore, the quantization error can be small in coding that is, requiring only a few bits.

Besides the same effect as that of the first embodiment, the communication system of the second embodiment can bring out another effect as follows. An influence of power control baser upon the prediction processing in mobile station 2B is eliminated from measured electric power, and the influence of the fading is eliminated by the prediction processing by base station 1B, and then difference from a target level is quantized, thereby decreasing quantization error. This can enhance restoration and prediction accuracy of the fading signal in mobile station 2B. Accordingly, the communication system of the second embodiment can follow change in fading more accurately, as compared with that of the first embodiment, because of grasping the actual state of the propagation path, namely, the receipt signal without components amplified under controlling in accordance with prediction. This can give higher communication quality.

<Other Embodiment>

The above embodiments illustrate 2 bits with respect to quantization coding; however, larger number of bits is available. Also, the quantization step (scale) may be constant.

Changes in a past fading signal up to time n can be approximated with, for example, a linear function or a quadratic function, whereby a fading signal after time D is predicted at time n. For the linear function or the quadratic function, for example, the method of least squares is applied for the calculation of coefficients that filtering circuit 44 uses.

The present invention can be applied to mobile communication systems according to the other communication approaches like the TDMA communication method and the FDMA communication method. Moreover, the present invention can be applied to communication systems in which two communication stations are both mobile stations, and to communication systems in which two communication stations are both base stations.

As described above, in a communication system and a communication apparatus according to the present invention, a second communication apparatus controlling a transmission power generates the prediction value of a fading signal at a future time D from current time, in which the time D denotes the period of time from measuring the electric power by first communication apparatus to executing the power control by the second communication apparatus, with taking into account processing delay time D. Accordingly, transmission power control to suppress a fading at the future time is performed, which can follow changes in fading accurately, thus leading to high communication quality.

What is claimed is:

1. A radio communication system, comprising:
a transmitter for transmitting a first signal to a receiver via an aerial propagation path;
a receiver for receiving a second signal which has experienced fading through the aerial propagation path;
said transmitter further comprising predicting means for predicting the state of fading after a specified period of time based upon a fading state signal at current time notified by the receiver, amplifying means for amplifying the first signal based upon the predicted state of fading, and transmitting means for transmitting the first signal;
said receiver further comprising receiving means for receiving the second signal, generating means for generating the fading state signal indicative of the state of fading at current time, and notifying means for notifying the transmitter of the fading state signal; and
wherein the predicting means predicts the state of fading after a specified period of time based upon the fading state signal at current time by applying linear prediction.

2. A radio communication system, comprising:
a transmitter for transmitting a first signal to a receiver via an aerial propagation path;
a receiver for receiving a second signal which has experienced fading through the aerial propagation path;
said transmitter further comprising predicting means for predicting the state of fading after a specified period of time based upon a fading state signal at current time notified by the receiver, amplifying means for amplifying the first signal based upon the predicted state of fading, and transmitting means for transmitting the first signal;
said receiver further comprising receiving means for receiving the second signal, generating means for generating the fading state signal indicative of the state of fading at current time, and notifying means for notifying the transmitter of the fading state signal; and wherein the generating means includes quantization means for quantizing the fading state signal using a few bits, and the predicting means includes inverse quantization means for implementing inverse quantization on the quantized fading state signal.

3. A radio communication system as set forth in claim 2, wherein the generating means includes quantization step determining means for determining quantization step of the fading state signal in quantizating by the quantization means.

4. A radio communication system as set forth in claim 3, wherein the quantization step determining means changes quantization steps by judging whether or not the current quantization step is suitable for quantization.

5. A radio communication system, comprising:
 a transmitter for transmitting a first signal to a receiver via an aerial propagation path;
 a receiver for receiving a second signal which has experienced fading through the aerial propagation path;
 said transmitter further comprising predicting means for predicting the state of fading after a specified period of time based upon a fading state signal at current time notified by the receiver, amplifying means for amplifying the first signal based upon the predicted state of fading, and transmitting means for transmitting the first signal;
 said receiver further comprising receiving means for receiving the second signal, generating means for generating the fading state signal indicative of the state of fading at current time, and notifying means for notifying the transmitter of the fading state signal; and
 wherein the generating means includes eliminating means for eliminating from the electric power of the second signal the electric power corresponding to the amplification by the amplifying means based on the predicted state of the fading, and wherein the generating means generates the fading state signal based on the second signal independent of the amplification by the amplifying means.

6. The radio communication system according to claim 5, wherein said generating means further comprises a local transmission power control circuit, a time D delay circuit, an adder, and a subtractor, wherein further, prediction coding is employed for coding a difference signal for a target level.

7. The radio communication system according to claim 6, wherein said local transmission power control circuit provides at time n a prediction value Xe (n+D|n) of a fading signal for time n+D, to time D delay circuit, and also provides at time n−1 a prediction value Xe (n|n−1) for a fading signal for time n.

8. The radio communication system according to claim 6, wherein time D delay circuit delays an input signal by time D, and outputs it for transmission to the mobile station.

* * * * *